No. 614,625. Patented Nov. 22, 1898.
T. SAUNDERS.
APPARATUS FOR CLEANING INSIDE OF SURFACE CONDENSER TUBES.
(Application filed Mar. 28, 1898.)
(No Model.)
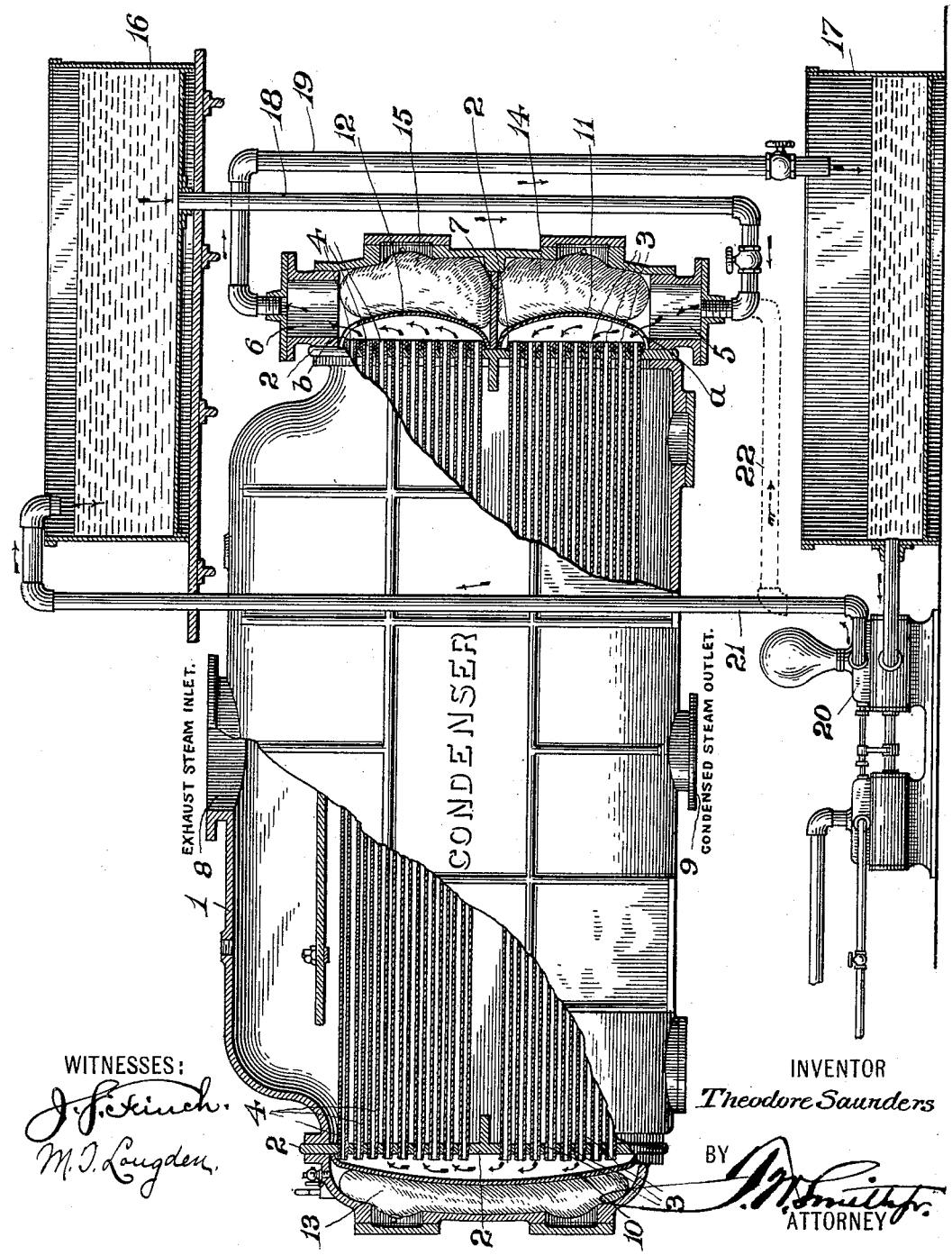
WITNESSES:
INVENTOR
Theodore Saunders
BY
ATTORNEY

UNITED STATES PATENT OFFICE.

THEODORE SAUNDERS, OF DANBURY, CONNECTICUT.

APPARATUS FOR CLEANING INSIDE OF SURFACE-CONDENSER TUBES.

SPECIFICATION forming part of Letters Patent No. 614,625, dated November 22, 1898.

Application filed March 28, 1898. Serial No. 675,485. (No model.)

*To all whom it may concern:*

Be it known that I, THEODORE SAUNDERS, a citizen of the United States, residing at Danbury, in the county of Fairfield and State of Connecticut, have invented certain new and useful Improvements in Apparatus for Cleaning the Inside of Surface-Condenser Tubes; and I do hereby declare the following to be a full, clear, and exact description of the invention, such as will enable others skilled in the art to which it appertains to make and use the same.

My invention relates to certain new and useful improvements in apparatus for removing the incrustation or scale which forms within the tubes of surface condensers for steam-engines, and has for its object to cleanse the tubes from all foreign substance quickly and efficiently and without in the slightest degree injuring the tubes or roughening the interior surfaces thereof.

With these ends in view my invention consists in certain details of construction and arrangement of parts hereinafter fully set forth and then specifically designated by the claims.

The accompanying drawing, which forms a part of this application, illustrates an elevation, partly in section and partly broken away, of an approved style of surface condenser with my improvement shown in attachment therewith in solid lines, while in dotted lines I have illustrated a modification of my improvement.

My invention aims to remove the scale or incrustation from the inside of the condenser-tubes without removing them from the condenser, and I accomplish this in a comparatively short space of time, not to exceed ten hours in the instance of the largest condensers. Heretofore this scale or incrustation has been removed by boring out the tubes at great expenditure of money and loss of time; but my invention provides for cleaning the inside of the tubes without any boring and without removing them from the tube-sheets, and, as I said before, this consumes at the outside only about ten hours, which is a remarkable saving of time as compared with the several weeks required for boring out the tubes by the old process, and, moreover, my improvement does not cost half as much as the boring process, and this does not take into consideration the value of the time saved to the ship. Moreover, by the use of my apparatus the tubes are left absolutely clean without injury, whereas by the boring process it is impossible to take out all the scale, since the boring-auger cannot be quite accurate, especially in long tubes, and consequently the auger will run into the sides of the tubes, thereby damaging them, which damage is sometimes so serious as to impair the efficiency of the condenser and render new tubes absolutely necessary; also in removing and replacing the tubes it often happens that the tube-heads of the condenser are cracked or warped and have to be replaced at additional cost.

Ever since the introduction of high-pressure steam in marine engines the fouling of the inside of the condenser-tubes has been a great annoyance to marine engineers and a great expense to steamship owners. All designers of marine engines are very careful to allow sufficient cooling-surface in the condensers, so as to condense all the steam that can be used in the cylinders when the machinery is driven to its utmost capacity. Whenever the tubes get choked with this scale or incrustation, they are thereby insulated from the cooling properties of the water that is forced through them, thus producing imperfect condensation, lowering of the vacuum, and great loss of speed and power, with increased cost for fuel.

The tubes are made of soft metal and with an inside finish, and in the boring process the auger scrapes the finish off and leaves the surface rough, and this roughness affords a secure anchorage for the scale, which latter thus forms much more quickly than it did originally when the tubes were new.

It is a well-known fact that in most cases it is extremely difficult to get the tubes out of a condenser, since the bulkheads have to be taken down or cut to make room for the taking out of the tubes, and in most instances the tubes cannot be cleaned while the ships are in service, and this entails great loss to the owners of the ships, since the condensers cannot condense the steam as fast as they could, thereby making a back pressure on the engine, so that the ship loses the speed that she could attain. Attempts have heretofore been made to clean these tubes by means of solvents; but in such instances the tubes have generally been removed from the tube-sheets, thus rendering the operation a long and expensive one, besides rendering it well nigh impossible to uniformly clean the tubes. In a pending application for Letters Patent of the United States, bearing Serial No. 665,654, filed by me January 5, 1898, I have shown and described a certain way of cleaning these tubes without removing them from the tube-sheets by means of a solvent introduced within and passed through these tubes one at a time, and while this method is quite efficient it nevertheless entails considerable expense, owing to the amount of time consumed in cleansing such tubes one at a time.

By my present invention I have made provisions for cleaning all the tubes at one operation and without removing them from the tube-sheets, and I will now proceed to describe the same, referring by numbers to the accompanying drawing.

1 is the casing or shell of the condenser; 2, the tube-sheets fixed therein; 3 4, the two series of tubes through which the water passes; 5, the water-inlet; 6, the water-outlet; 7, the horizontal partition which divides one water-head end of the condenser beyond the adjacent tube-sheet, so that the water is forced to pass through one series of tubes and up and out through the other series of such tubes; 8, the steam-inlet, and 9 the condensed-steam outlet.

The construction above described constitutes a well-known and approved form of surface condenser, and of course forms no part of my present invention. Since these surface condensers are not by any means small affairs, but are of rather large dimensions, the spaces between the end walls of the condenser and the tube-sheets and which constitute the water-heads are quite large and are capable of holding a great many gallons, and therefore I have provided vertical partitions within the head at the farther end of the condenser and within each of the separate compartments of the head where the inlet and outlet for the water are provided, which partitions are bowed outwardly toward the end walls of the condenser and inclose the entire surfaces of the tube-sheets and are backed by inflated rubber bags.

10 is a vertical partition which divides the head at the farther end of the condenser and which incloses the entire tube-sheet at that end, and 11 12 are respectively vertical partitions which are within the separate compartments that respectively communicate with the inlet and outlet for the water at the other head of the condenser, these two partitions inclosing the portions of the tube-sheet which bound said compartments and being provided with openings *a b*, leading to the tubes.

13 is a properly-shaped rubber bag within one head of the condenser and between the end wall thereof and the partition 10, which bag when inflated with air will fill this space and closely conform to and press against this partition, so as to substantially render water-tight the space between this partition and the adjacent tube-sheet, and 14 15 are similar but smaller rubber bags within the separate compartments formed by the partition 7 and between the end wall of the head and the partitions 11 12, which bags when inflated with air likewise fill up these compartments and press firmly against said partitions and render substantially water-tight the spaces between said partitions and the adjacent tube-sheet.

16 is any suitable tank supported on the usual grating above the condenser, and 17 is a similar tank resting on the floor near the base of the condenser. A suitable solvent, whose character will of course be changed according to the nature of the incrustation or scale inside the tubes, is contained in the upper tank, and a pipe 18 leads down from this tank and projects through the water-inlet, and this solvent will flow by gravity down through the lower series of tubes into the space at the other end of the condenser between the tube-sheet and the partition 10, and thence through the upper series of tubes into the upper-compartment space near the water-outlet, and then down through any suitable pipe 19 into the tank 17.

20 is any suitable pump, by means of which the solvent is elevated through a pipe 21 from the lower tank into the upper tank. Connections may of course be made with this pump, as shown in dotted lines at 22, whereby the solvent may be forced up through the series of tubes instead of utilizing a gravity fall of the solvent, and I therefore do not wish to be limited in this respect, the gist of my invention resting in the broad idea of driving the solvent up through the entire series of tubes simultaneously behind the gases which naturally form without removing such tubes from the tube-sheets.

In utilizing my improvement I take off the heads of the condenser, put in the inflated rubber bags and partitions, and then replace such heads; but I do not wish to be limited to the use of these partitions and rubber bags, since they merely contract the space in the water-heads of the condenser, whereby I am enabled to save considerable of the solvent, and I am therefore enabled to clean the tubes without removing the condenser-heads and without the use of such bags and partitions.

It will be observed that in using my improvement there will be a continuous current of the solvent simultaneously through the lower series of tubes, thence up through the upper series of tubes, and thence down into the lower tank, and it will be also noted that the gases will form ahead of the solvent, so that they will not resist the flow of such solvent.

I claim—

1. An apparatus for cleaning the inside of surface-condenser tubes, comprising a tank containing a suitable liquid solvent, a tube leading from such tank into the water-inlet of the condenser, a tube leading from the water-outlet into any suitable receptacle, and means for forcing the solvent through the first-mentioned tube and out through the last-mentioned tube, substantially as set forth.

2. In an apparatus for cleaning the inside of surface-condenser tubes, the tanks located respectively above and below the condenser, a tube leading from the upper tank down into the water-inlet of the condenser, and a tube leading from the water-outlet of the condenser down into the lower tank, substantially as set forth.

3. In an apparatus for cleaning the inside of surface-condenser tubes, the combination of the upper tank containing a suitable liquid solvent, the pipe leading from said tank down into the water-inlet of the condenser, the lower tank, the pipe leading from the water-outlet of the condenser down into said lower tank, and a pump for forcing the liquid solvent from the lower tank back into the upper tank, substantially as set forth.

In testimony whereof I affix my signature in presence of two witnesses.

THEODORE SAUNDERS.

Witnesses:
WILLIAM CONNAIR,
WILLIAM TARGETT.